(No Model.)
E. W. GUNN.
RAKE.
No. 393,105. Patented Nov. 20, 1888.
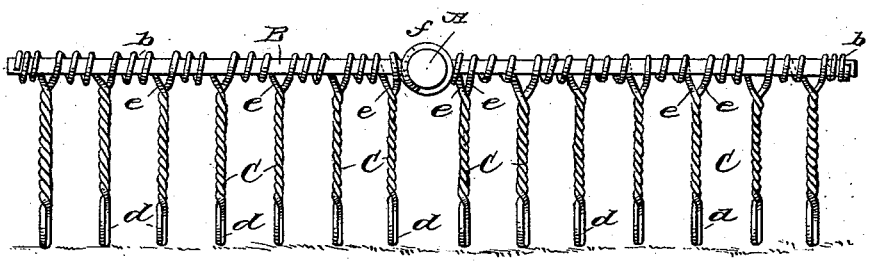
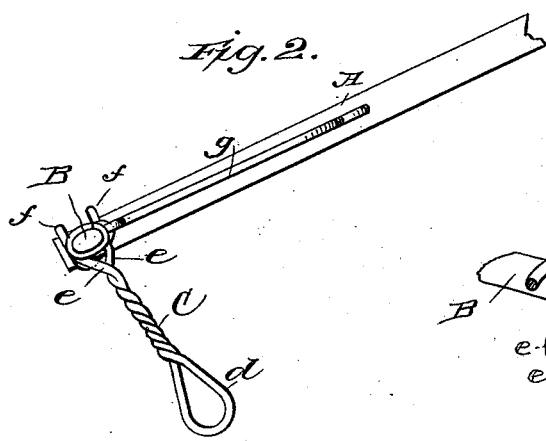
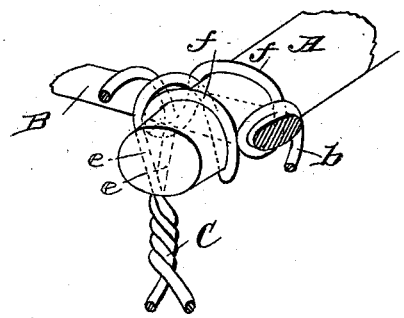
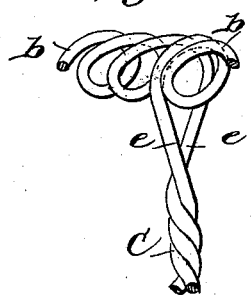
WITNESSES:
W. R. Davis.
C. Sedgwick.
INVENTOR:
E. W. Gunn.
BY Munn & Co
ATTORNEYS.

United States Patent Office.

E. WILLIAM GUNN, OF NEW WOODSTOCK, NEW YORK.

RAKE.

SPECIFICATION forming part of Letters Patent No. 393,105, dated November 20, 1888.

Application filed February 10, 1888. Serial No. 263,572. (No model.)

*To all whom it may concern:*

Be it known that I, E. WILLIAM GUNN, of New Woodstock, in the county of Madison and State of New York, have invented a new and useful Improvement in Hay and other Rakes, of which the following is a full, clear, and exact description.

This invention relates more particularly to the head portions of hay and other like rakes, including the construction of the teeth of the rake, their connection with the head of the latter, and attachment of the whole to the handle of the rake; and the invention consists in certain novel constructions, connections, and attachments of said parts, substantially as hereinafter described, and pointed out in the claims.

Reference is to be had to the accompanying drawings, forming a part of this specification, in which similar letters of reference indicate corresponding parts in all the figures.

Figure 1 represents a front elevation of a rake embodying my invention; and Fig. 2, a side view of the same, showing the handle partly broken away. Fig. 3 is a view in perspective of the front end portion of the handle, the head or bar in part which carries the teeth, and a portion of the wire of which the teeth are formed, mainly in illustration of a ferrule-like tie of said wire on the forward end of the handle of the rake. Fig. 4 is a view in perspective of a portion of the wire used to form the teeth detached from the head or bar and of one of the teeth in part.

A is the handle of the rake, and B the head or cross-bar which carries the teeth C.

The bar B is a metal one, preferably of oval construction in transverse section, for a reason that will be hereinafter explained. Said bar may be fitted to the handle A either by passing it through an aperture or mortise therein or by entering it within a slot in the front end of the handle, as may be found most convenient.

The teeth C are made of a single piece of wire, *b*, coiled in a like direction around the head or bar B throughout the length of the latter on either side of the handle A, said wire being made to dip at suitable distances apart in the coiling of it upon the bar for the purpose of producing extensions of which to form the teeth C. In making the teeth C the wire is doubled and twisted upon itself, and in a general way is manipulated to leave a loop, *d*, at the bottom of each tooth. These loops, which form feet to prevent the teeth from digging into the ground or catching in rubble or other obstructions, are arranged to be in the same plane, or thereabout, as the shanks of the teeth in a transverse direction to the head of the rake, so as to leave the spaces between the teeth clear; and said loops are of a tapering form, with their narrowest ends uppermost, to allow of the easy sliding of the hay or substance being raked from off them. This shape and the arrangement of the loops will prevent the teeth of the rake from becoming clogged with the hay. In some cases—as, for instance, in garden-rakes—the loops *d* may be omitted or be cut off and the wire be swaged close at the lower ends of the teeth. The wire being doubled and twisted upon itself to form the teeth gives great strength to the latter, and where said wire, which closely hugs the head or bar B, passes from the teeth to or around said bar it is made to form a crutch or double brace, *e*, lapping around the bar on opposite sides thereof, thereby holding each tooth firmly in position and giving it increased strength. By making the head or bar B of oval or flat form in transverse section the teeth are not only prevented from turning on the bar, but the wire *b* has a close hug all around the bar, which of course is desirable for strength. As the wire *b*, which is a continuous one, leaves the tooth next to one side of the handle A to pass to the tooth next to the other side of the handle, it is made to form a double and interlocking tie or twist, as at *f f*, around the forward end of the handle, as clearly shown in Fig. 3, thus answering the purpose of a ferrule to secure the head of the rake on the handle and to add to the stability of the whole.

The usual or any number of braces may be used connecting the head of the rake with the handle, and the same be made to hook at their forward ends with one of the wraps of the wire *b* on the head or bar, as shown for the single brace *g* in Fig. 2.

Having thus described my invention, what I claim as new, and desire to secure by Letters Patent, is—

1. The combination, with the head or cross-bar of the rake and its handle, of rake-teeth constructed of a continuous piece of wire coiled around said bar, likewise doubled and twisted upon itself to form the teeth and twisting around the forward end of the handle, thus answering as a ferrule therefor, as shown and described.

2. In a rake, the combination, with the head or cross-bar B, made oval in transverse section, of the continuous wire $b$, coiled around said bar and doubled and twisted upon itself to form the teeth of the rake, substantially as specified.

E. WILLIAM GUNN.

Witnesses:
A. GREGORY,
C. SEDGWICK.